(No Model.)

J. NAUGHTEN.
STOVE PIPE JOINT.

No. 261,473. Patented July 18, 1882.

WITNESSES
J. E. Clark.
W. J. Osgood.

INVENTOR.
James Naughten.
Howard A. Snow.
Attorney

UNITED STATES PATENT OFFICE.

JAMES NAUGHTEN, OF DAYTON, OHIO.

STOVE-PIPE JOINT.

SPECIFICATION forming part of Letters Patent No. 261,473, dated July 18, 1882.

Application filed June 7, 1882. (No model.)

*To all whom it may concern:*

Be it known that I, JAMES NAUGHTEN, a citizen of the United States, residing at Dayton, in the county of Montgomery and State of Ohio, have invented certain new and useful Improvements in Stove-Pipe Joints, of which the following is a specification, reference being had therein to the accompanying drawings.

My invention relates to stove-pipe joints, the construction and operation of which will be hereinafter fully set forth.

Figure 2:
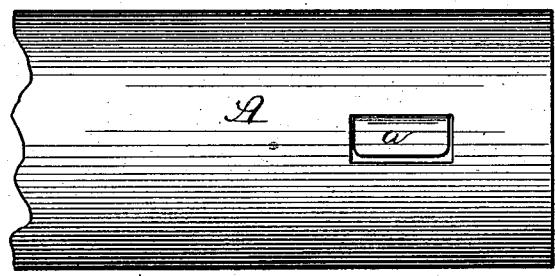
Figure 1:
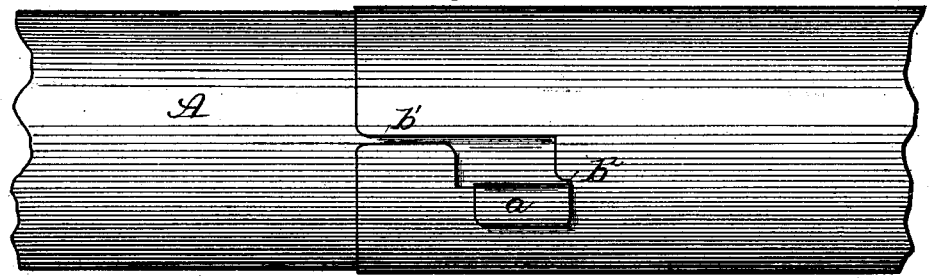
Figure 3:
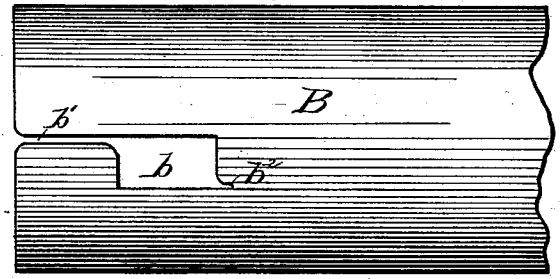

In the drawings, Figure 1 is a view of the pipes joined, and Figs. 2 and 3 views of the ends of the pipes to be joined with my lock upon them.

In the circumference of the pipe A is cut a ⊓-shaped slot, which leaves a tongue of metal, $a$, within it. A slight bend or elbow is made in the tongue where it joins the pipe sufficient to allow the adjoining pipe to pass under the tongue where said pipes are joined. In the pipe B is cut a rectangular space, $b$. It communicates with the end of the pipe by a narrow slot, $b'$, which runs parallel with the length of the pipe. The upper corner of the space $b$, opposite the side upon which is placed the slot $b'$, is a notch, $b^2$, which operates to prevent the pipes from becoming unjointed. The use of this notch is shown in Fig. 1.

To make a joint the tongue $a$ is passed along the slot $b'$. When the tongue is in the space $b$ the pipes are twisted until the tongue $a$ overlaps the pipe B upon the side next the notch $b^2$. The pipe A is then pressed into the pipe B until the tongue $a$ has entered the notch $b^2$, as shown in Fig. 1.

By this construction of the pipes a strong secure joint is formed.

What I claim is—

1. The pipe A, having a tongue, $a$, adapted to enter the slot $b'$ and space $b$ of the pipe B, substantially as shown and described.

2. The pipe B, having a space, $b$, cut in it, a slot, $b'$, and notch $b^2$, said space being adapted to receive the tongue $a$ of the pipe A, substantially as shown and described.

3. The combination of the pipe A, having a tongue, $a$, formed in its circumference, with the pipe B, having a space, $b$, cut in it, a slot, $b'$, and notch $b^2$, all arranged substantially as shown and described.

In testimony whereof I affix my signature in presence of two witnesses.

JAMES NAUGHTEN.

Witnesses:
H. H. WAYMAN,
GEORGE HUBBARD.